United States Patent
Sarma et al.

(10) Patent No.: US 9,884,927 B2
(45) Date of Patent: Feb. 6, 2018

(54) HETEROGENEOUS ZIEGLER-NATTA CATALYST SYSTEM AND A PROCESS FOR OLEFIN POLYMERIZATION USING THE SAME

(71) Applicant: Reliance Industries Limited, Mumbai (IN)

(72) Inventors: Krishna Renganath Sarma, Gujarat (IN); Yogesh Popatrao Patil, Gujarat (IN); Viralkumar Patel, Gujarat (IN); Mahuya Bagui, Gujarat (IN); Ajit Behari Mathur, Gujarat (IN); Raksh Vir Jasra, Gujarat (IN); Suketu Vakil, Mumbai (IN); Vijay Shivaji Kadam, Maharashtra (IN); Uma Sankar Satpathy, Gujarat (IN); Satya Srinivasa Rao Gandham, Gujarat (IN); Jyotindra Bachubhai Patel, Gujarat (IN); Mitul Sureshchandra Sheth, Gujarat (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 0 days.

(21) Appl. No.: 14/655,994

(22) PCT Filed: Dec. 13, 2013

(86) PCT No.: PCT/IN2013/000769
§ 371 (c)(1),
(2) Date: Jun. 26, 2015

(87) PCT Pub. No.: WO2014/102813
PCT Pub. Date: Jul. 3, 2014

(65) Prior Publication Data
US 2015/0344593 A1 Dec. 3, 2015

(30) Foreign Application Priority Data

Dec. 31, 2012 (IN) .......................... 3737/MUM/2012

(51) Int. Cl.
| C08F 4/654 | (2006.01) |
| C08F 4/655 | (2006.01) |
| C08F 4/656 | (2006.01) |
| C08F 10/02 | (2006.01) |
| C08F 110/02 | (2006.01) |
| C08F 4/649 | (2006.01) |
| C08F 4/642 | (2006.01) |
| C08F 4/645 | (2006.01) |
| C08F 10/00 | (2006.01) |

(52) U.S. Cl.
CPC ............ *C08F 110/02* (2013.01); *C08F 4/649* (2013.01); *C08F 4/6425* (2013.01); *C08F 4/6426* (2013.01); *C08F 4/6455* (2013.01); *C08F 4/6457* (2013.01); *C08F 10/00* (2013.01)

(58) Field of Classification Search
CPC ...... C08F 4/6425; C08F 4/6426; C08F 4/649; C08F 4/6455; C08F 4/6457; C08F 10/02
See application file for complete search history.

(56) References Cited

U.S. PATENT DOCUMENTS

| 4,962,167 | A   |   | 10/1990 | Shiraishi et al. |
| 5,418,308 | A   | * | 5/1995  | Harvie ................. C08F 210/06 |
|           |     |   |         | 524/576 |
| 6,559,249 | B2  |   | 5/2003  | Yang et al. |
| 7,196,152 | B2  |   | 3/2007  | Alt et al. |
| 7,371,806 | B2  |   | 5/2008  | Ferraro et al. |
| 2011/0159287 | A1 |   | 6/2011 | Friederichs et al. |
| 2011/0183097 | A1 |   | 7/2011 | Barre et al. |

FOREIGN PATENT DOCUMENTS

| AU | 2002316912 | 12/2002 |
| BR | P10209871-7 | 5/2011 |
| CA | 2057688 | 12/1991 |
| EP | 1260547 | 11/2002 |
| EP | 1321479 | 6/2003 |
| EP | 1321499 | 6/2003 |

(Continued)

OTHER PUBLICATIONS

Padmanabhan et al, Controlled Catalyst Dosing: An Elegant Approach in Molecular Weight Regulation for UHMWPE, Macromolecular Reaction Engineering, vol. 3, Issue 5-6, Jul. 13, 2009, pp. 257-262.

Clowes, Luct et al., Vanadium (III) phenoxyimine compleses for ethylene or caprolactone polymerization: mononuclear versus binuclear pre-catalyst; Catalysis Science & Technology; 2013, 3, p. 152-160.

*Primary Examiner* — Caixia Lu
(74) *Attorney, Agent, or Firm* — Fish IP Law LLC

(57) ABSTRACT

The present disclosure provides a heterogeneous Ziegler-Natta catalyst system to be used in the preparation of ultra-high molecular weight polymers (UHMWP). The system includes at least one procatalyst, at least one co-catalyst, at least one hydrocarbon medium and at least one external donor, wherein the ratio of elemental magnesium to elemental titanium to halide, in the procatalyst, is 1:1.3:3.7; the ratio of elemental aluminum, present in the co-catalyst to elemental titanium, present in the procatalyst, ranges between 6:1 and 12:1; and the ratio of elemental silicon, present in the external donor to elemental titanium, present in the procatalyst, ranges between 1:10 and 10:1. The present disclosure also provides a process for preparation of UHMWPE using the heterogeneous Ziegler-Natta catalyst system of the present disclosure.

14 Claims, No Drawings

(56) References Cited

FOREIGN PATENT DOCUMENTS

| | | |
|---|---|---|
| EP | 2366722 | 9/2011 |
| JP | 2010537028 | 4/2010 |
| MX | PA03010690 | 7/2005 |
| WO | 9743321 | 11/1997 |
| WO | 02094922 | 11/2002 |
| WO | 03055921 | 7/2003 |
| WO | 03106511 | 12/2003 |
| WO | 2008093953 | 8/2008 |
| WO | 2011039152 | 4/2011 |
| WO | 2011106497 | 9/2011 |
| WO | 2011133313 | 10/2011 |
| WO | 2012109012 | 8/2012 |
| WO | 2012119953 | 9/2012 |
| WO | 2012119954 | 9/2012 |
| WO | 2012149360 | 11/2012 |

* cited by examiner

HETEROGENEOUS ZIEGLER-NATTA CATALYST SYSTEM AND A PROCESS FOR OLEFIN POLYMERIZATION USING THE SAME

FIELD OF THE DISCLOSURE

The present disclosure relates to heterogeneous Ziegler-Natta catalyst systems. More particularly, the present disclosure relates to a process for the polymerization of olefins that employs a heterogeneous Ziegler-Natta catalyst system.

BACKGROUND

Ultra-high molecular weight (UHMW) polyolefin, especially UHMW polyethylene, with a molecular weight of $1 \times 10^6$ g/mol (gram per mole) or higher, is a commercially desired polymer because of its toughness and high impact strength, which is mainly influenced by the length of the molecular chain. The long molecular chain serves to transfer load more effectively to the polymer back-bone by strengthening the intermolecular interactions. Further, such polymers with long molecular chains are highly resistant to corrosive chemicals with the exception of oxidizing acids, and have extremely low moisture absorption capability, have a very low coefficient of friction, are self-lubricating and are highly resistant to abrasion. Based on the aforementioned unique properties, UHMW polyolefins have a variety of important commercial applications such as in protection fabrics, joint replacement materials and micro porous films.

Various conventional olefin polymerization processes are generally carried out in the presence of either homogenous or heterogeneous Ziegler-Natta catalyst systems. A heterogeneous Ziegler-Natta catalyst system is prepared by the activation of a Magnesium-Titanium (Mg—Ti) base by adding an organo-aluminum co-catalyst. To improve the activity of the catalyst and also to achieve and enhance certain polymer characteristics, either an internal electron donor compound is added to the Mg support before the activation of the catalyst or an external electron donor compound is added after the activation of the catalyst. Both the donors are mainly added to stabilize the geometry of the titanium ($Ti^{+3}$) ion which governs the molecular weight of the polymerized olefin, besides controlling certain other polymer characteristics. In comparison, a homogeneous single site catalyst system includes a complex of different organic ligands with elements such as Titanium (Ti), Zirconium (Zr), Hafnium (Hf) and the like which can result in metallocenes where cyclopentadiene is used and non-metallocenes where cyclopentadiene is absent. The homogeneous single site catalyst system further includes a co-catalyst such as methylaluminoxane (also known as methylalumoxane). However, preparation of such homogeneous single site catalyst systems is cost-ineffective because of the use of co-catalysts that are generally expensive. Further, the use of methylaluminoxane as the co-catalyst results in-fouling of the polymerization unit, in most of the cases, as large quantities are needed to activate the catalyst systems. Consequently, use of the homogeneous single site catalyst system is expensive to maintain the polymerization unit.

As Titanium ($Ti^{+3}$) ions play an important role in the polymerization process, efforts have been directed towards modification of Ziegler-Natta catalyst systems, especially by using electron donors which play an important role in the stabilization of $Ti^{+3}$ ions in an activated catalyst and facilitate an increase in the length of the polymer chain. A variety of compounds have been explored as internal and/or external electron donors for modification of the heterogeneous Ziegler-Natta catalyst system.

U.S. Pat. No. 4,962,167, US2011/0159287, and U.S. Pat. No. 6,559,249 disclose polymerization processes catalysed by Ziegler-Natta catalyst compositions including a Mg-ethoxide-Ti-tetrabutoxide base with an organo-aluminum co-catalyst, with electron donor groups such as alcohols, ethers, esters, silanes and amines, for the preparation of UHMW polyethylene. The disclosed processes depict an increase in bulk density, intrinsic viscosity as well as molecular weight of the resulting UHMW polyethylene with a narrow molecular weight distribution.

Further, U.S. Pat. No. 7,371,806 discloses a process for the preparation of ethylene co-polymer with olefins, having molecular weight distribution higher than three using a Ziegler-Natta catalyst system that includes Magnesium Chloride ($MgCl_2$) and Titanium tetra-alkoxide ($Ti(OR)_4$) base with specific 1,3-diethers and an organo-aluminum co-catalyst. The process also demonstrates that addition of a small amount of an electron donor reduces the concentration of the polymer chains having molecular weight less than $1 \times 10^6$ g/mol in the resulting product.

WO2012119953 discloses processes for the preparation of UHMW polyethylene by blending two low molecular weight polyethylene resins, prepared by polymerization of ethylene in presence of a Ziegler-Natta catalyst composition including Ti supported on Mg-alkoxide along with triethyl aluminum (TEAL) as a co-catalyst. The catalyst is prepared by the addition of halogenating/titaning agent in three successive addition steps followed by addition of co-catalyst.

CA2057688 discloses a process for the preparation of polyolefins, such as polyethylene, using a Ziegler-Natta catalytic composition that includes a pro-catalyst based on a titanium compound (preferably $TiCl_4$ on $MgCl_2$ carrier) and triethyl aluminum as a co-catalyst and an organo-silane compound (preferably 4-t-butyl-phenyl-trimethoxysilane, biphenyl-trimethoxysilane or methyl(phenoxyphenyl)-di-methoxysilane) as an external donor. The catalyst is prepared by mixing triethyl aluminum and 4-t-butyl trimethoxysilane as an external donor into dried heptane followed by addition of the solid pro-catalyst. The catalyst composition thus, obtained is directly added to the polymerization reaction.

EP607771 discloses a process for the preparation of polypropylene by polymerization of propylene using a Ziegler-Natta catalyst composition that includes Mg—Ti base, triethylaluminum as a co-catalyst and di-t-butyl dimethoxysilane as an external donor. The Ziegler-Natta catalytic composition is prepared by addition of a mixture comprising donor and the co-catalyst to the Mg—Ti base that is then added to the polymerization process.

EP1877450 discloses a process for the preparation of an olefinic polymer comprising contacting at least one olefinic monomer with a carbon chain consisting of more than three carbon atoms (C3+) in the presence of Ziegler-Natta catalyst composition consisting of Titanium supported on Mg support, trialkyl aluminum as a co-catalyst and dicyclopentyl dimethoxysilane as a first electron donor and a second electron donor selected from the group consisting of methyl trimethoxysilane, methyl triethoxysilane, dimethyl dimethoxysilane and combinations thereof. The catalytic composition is prepared by the addition of the co-catalyst followed by the addition of the mixture comprising donors, to the Mg—Ti base. The resulting catalyst composition is then added to the polymerization process.

WO1997043321 discloses a process for the preparation of polyolefin, more specifically polypropylene, in presence of Ziegler-Natta catalyst composition comprising Ti supported on $MgCl_2$ base, (TEAL) as a co-catalyst and two or more external electron donors that consist of a mixture of at least two silane compounds. The catalyst composition is prepared by the addition of a co-catalyst followed by the addition of a mixture comprising external donors to the Mg—Ti catalyst support. The resulting catalytic composition is then added to the polymerization process.

KR1997700702 discloses a process for the preparation of polyolefin in the presence of a Ziegler-Natta catalyst composition where Ti supported on $MgCl_2$ base, (TEAL) as a co-catalyst and two external electron donors consisting of a mixture of at least two silane compounds out of which one is dominant. The catalyst composition is prepared by the addition of a mixture of a co-catalyst and external electron donors to the commercially available Ti—Mg catalyst followed by the addition of the catalytic composition to the polymerization reaction.

BRPI0209871, IN231212, MX275899, IN239275, IN20030196P61, IN200301968, MX2003010690, HU200400057, AU2002316912 and AU2002302619A1 disclose processes for the preparation of polypropylene film used for coating purposes by employing Ziegler-Natta catalyst composition that consists of titanium-containing solids components, an organo-aluminum, magnesium or titanium compound as a co-catalyst and an external donor of formula RxR'ySi(MeO)4-x-y'.

JP2010537028 discloses a process for the preparation of a co-polymer of ethylene in the presence of a Ziegler-Natta catalyst composition comprising titanium, magnesium or halogen, an aluminum alkyl compound as a co-catalyst and silane compounds such as methyldimethoxysilane, methyldiethoxysilane or trimethoxysilane as external electron donors. After the addition of the trialkyl aluminum co-catalyst, the activated catalyst is subjected to pre-polymerization followed by the addition of the silane compound. The resultant catalytic mixture is then added to the polymerization process.

Furthermore, Basell in U.S. Pat. No. 7,196,152 and U.S. Pat. No. 7,371,806 has also attempted the use of donors in a process for the preparation of high density polyethylene with the objective of reducing the wax content in the polymer.

From the foregoing, it is observed that a large number of polymerization processes with heterogeneous Ziegler-Natta catalyst systems have been developed in recent years. However, none of the aforementioned processes demonstrate any significant increase in the molecular weight and other physicochemical properties of the polyolefin products. Thus, there exists a long felt need for specifically engineering heterogeneous Ziegler-Natta catalyst systems in order to increase the molecular weight of the resultant polyolefin significantly.

DEFINITIONS

As used in the present disclosure, the following words and phrases are generally intended to have the meaning as set forth below, except to the extent that the context in which they are used to indicate otherwise.

The term "ASTM scale" as used herein indicates a standard method (ASTM-D 4020-01a) used to calculate molecular weight of polyolefin prepared by the polymerization process of the present invention based on the intrinsic viscosity of a 0.02% solution in decalin at 135° C. and using the equation $M=K[\acute{\eta}]^\alpha$; where $\acute{\eta}$ is the intrinsic viscosity, K=53700 and α=1.37.

OBJECTS

Some of the objects of the present disclosure, which at least one embodiment is able to achieve, are discussed herein below.

It is an object of the present disclosure to provide a heterogeneous Ziegler-Natta catalyst system.

It is another object of the present disclosure to provide an olefin polymerization process that employs the heterogeneous Ziegler-Natta catalyst system.

It is yet another object of the present disclosure to provide a process for the preparation of polyolefin having ultra-high molecular weight, with increased bulk density and intrinsic viscosity.

It is still another object of the present disclosure to provide a process for the preparation of UHMW polyolefin having narrow molecular weight distribution and low average particle size through a uniform and narrower particle size distribution.

It is yet another object of the present disclosure to provide a process for the preparation of UHMW polyolefin that is simple, economical and environment friendly.

It is still another object of the present disclosure to ameliorate one or more problems of the prior art or to at least provide a useful alternative.

Other objects and advantages of the present disclosure will be more apparent from the following description which is not intended to limit the scope of the present disclosure.

SUMMARY

The present disclosure provides a heterogeneous Ziegler-Natta catalyst system comprising:
a. at least one procatalyst comprising:
   i. at least one titanium halide as a catalyst; and
   ii. at least one magnesium compound as a base, wherein, the ratio of said catalyst to said base ranges between 1.1:1.5 and 0.8:1.2;
b. at least one co-catalyst comprising at least one organo-aluminum compound, wherein the ratio of said organo-aluminum compound to said procatalyst ranges between 9:15 and 1.2:0.8;
c. at least one hydrocarbon medium in an amount ranging between 0.4 and 0.61 per 0.1 mmole of the catalyst; and
d. at least one external donor comprising at least one organo-silane compound of Formula I, wherein the ratio of said organo-silane compound to said procatalyst ranges between 1:10 and 10:1,

Formula I wherein $R_1$, $R_2$, $R_3$ and $R_4$ of said organo-silane compound is at least one selected from the group consisting of $C_1$-$C_{14}$ branched or straight chain alkyl, $C_1$-$C_{14}$ branched or straight chain alkyl oxy, substituted or unsubstituted aryl, substituted or unsubstituted aryl oxy, $C_4$-$C_{14}$ cyclic alkyl and $C_4$-$C_{14}$ cyclic alkyl oxy, said heterogeneous Ziegler-Natta catalyst system characterized in that:

i. the ratio of elemental magnesium to elemental titanium to halide, in the procatalyst, is 1:1.3:3.7;
ii. the ratio of elemental aluminum, present in said organo-aluminum compound to elemental titanium, present in said procatalyst, ranges between 6:1 and 12:1; and
iii. the ratio of elemental silicon, present in said organo-silane compound to elemental titanium, present in said procatalyst, ranges between 1:10 and 10:1.

Typically, said titanium halide is at least one selected from the group consisting of titanium chloride, titanium bromide, titanium iodide and titanium fluoride.

Typically, said magnesium compound is at least one selected from the group consisting of magnesium halide, magnesium oxide, magnesium hydroxyl halides and magnesium salts of inorganic oxygen containing acids.

Typically, said organo-aluminum compound is at least one selected from the group consisting of triethyl aluminum, tridecyaluminum, tri-n-butyl aluminum, tri-isopropyl aluminum, tri-isoprenyl aluminum, tri-isobutyl aluminum hydride, ethyl aluminumsesquichloride, diethyl aluminum chloride, di-isobutyl aluminum chloride, triphenyl aluminum, tri-n-octyl aluminium and tri-n-decyl aluminum.

Typically, said hydrocarbon medium is at least one selected from the group consisting of pentane, hexane, cyclohexane, methyl cyclohexane, heptane, octane, nonane, decane, isopentane, varsol and isomers thereof.

Typically, said organo-silane compound is at least one selected from the group consisting of tetraethoxysilane, cyclohexylmethyldimethoxysilane, dicyclopentyldimethoxysilane, isobutylisopropyldimethoxysilane, n-propyltriethoxysilane, isobutyltriethoxysilane, phenyltriethoxysilane, diisopropyldimethoxysilane, diethyldimethoxysilane, diisobutyldimethoxysilane, aminopropyltriethoxysilane, diphenyldimethoxysilane and methyltrimethoxysilane.

The present disclosure further provides a process for the preparation of a heterogeneous Ziegler-Natta catalyst system; said process comprising the following steps:
i. titanating at least one magnesium compound with at least one titanium halide, followed by allowing said titanium halide to bond with said magnesium compound, to obtain a mixture comprising at least one procatalyst; wherein the ratio of said magnesium compound to said titanium halide ranges between 0.8:1.2 and 1.1:1.5 and the ratio of elemental magnesium to elemental titanium to halide is 1:1.3:3.7;
ii. separating and washing said mixture comprising the procatalyst to obtain a procatalyst;
iii. admixing said procatalyst and at least one organo-aluminum compound as a co-catalyst, in the presence of at least one hydrocarbon medium, to obtain an activated catalyst, wherein the ratio of said organo-aluminum compound to said procatalyst ranges between 9:15 and 1.2:0.8 and the ratio of elemental aluminum, present in said organo-aluminum compound to elemental titanium, present in said procatalyst, ranges between 6:1 and 12:1; and
iv. adding, in a controlled manner, at least one organo-silane compound of Formula 1 as an external donor to said activated catalyst, in the presence of at least one hydrocarbon medium, under inert conditions, at a temperature ranging between 25 and 30° C. and over a time period ranging between 2 and 10 minutes, to obtain a heterogeneous Ziegler-Natta catalyst system, wherein the ratio of said organo-silane compound to said procatalyst ranges between 1:10 and 10:1 and the ratio of elemental silicon, present in said organo-silane compound to elemental titanium, present in said procatalyst, ranges between 1:10 and 10:1,

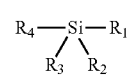

Formula I wherein $R_1$, $R_2$, $R_3$ and $R_4$ of said organo-silane compound is at least one selected from the group consisting of $C_1$-$C_{14}$ branched or straight chain alkyl, $C_1$-$C_{14}$ branched or straight chain alkyl oxy, substituted or unsubstituted aryl, substituted or unsubstituted aryl oxy, $C_4$-$C_{14}$ cyclic alkyl and $C_4$-$C_{14}$ cyclic alkyl oxy.

Typically, said magnesium compound is at least one selected from the group consisting of magnesium halide, magnesium oxide, magnesium hydroxylhalide and magnesium salt of inorganic oxygen containing acids.

Typically, said titanium halide is at least one selected from the group consisting of titanium chloride, titanium bromide, titanium iodide and titanium fluoride.

Typically, said organo-aluminum compound is at least one selected from the group consisting of triethyl aluminum, tridecyaluminum, tri-n-butyl aluminum, tri-isopropyl aluminum, tri-isoprenyl aluminum, tri-isobutyl aluminum hydride, ethyl aluminum sesquichloride, diethyl aluminum chloride, di-isobutyl aluminum chloride, triphenyl aluminum, tri-n-octyl aluminium and tri-n-decyl aluminum.

Typically, said hydrocarbon medium is at least one selected from the group consisting of pentane, hexane, cyclohexane, methyl cyclohexane, heptane, octane, nonane, decane, isopentane, varsol and isomers thereof.

Typically, the hydrocarbon medium of steps (iii) and (iv) are same or different.

Typically, said organo-silane compound is at least one selected from the group consisting of tetraethoxysilane, cyclohexylmethyldimethoxysilane, dicyclopentyldimethoxysilane, isobutylisopropyldimethoxysilane, n-propyltriethoxysilane, isobutyltriethoxysilane, phenyltriethoxysilane, diisopropyldimethoxysilane, diethyldimethoxysilane, diisobutyldimethoxysilane, aminopropyltriethoxysilane, diphenyldimethoxysilane and methyltrimethoxysilane.

The present disclosure further provides a process for the preparation of a polyolefin; said process comprising the following steps:
i. titanating at least one magnesium compound with at least one titanium halide, followed by allowing said titanium halide to bond with said magnesium compound, to obtain a mixture comprising at least one procatalyst; wherein the ratio of said magnesium compound to said titanium halide ranges between 0.8:1.2 and 1.1:1.5 and the ratio of elemental magnesium to elemental titanium to halide is 1:1.3:3.7;
ii. separating and washing said mixture comprising the procatalyst to obtain a procatalyst;
iii. admixing said procatalyst and at least one organo-aluminum compound as a co-catalyst, in the presence of at least one hydrocarbon medium, to obtain an activated catalyst, wherein the ratio of said organo-aluminum compound to said procatalyst ranges between 9:15 and 1.2:0.8 and the ratio of elemental aluminum, present in said organo-aluminum compound to elemental titanium, present in said procatalyst, ranges between 6:1 and 12:1; and
iv. adding, in a controlled manner, at least one organo-silane compound of Formula 1 as an external donor to said activated catalyst, in the presence of at least one hydrocarbon medium, under inert conditions, at a temperature ranging between 25 and 30° C. and over a time period ranging between 2 and 10 minutes, to obtain a heterogeneous Ziegler-Natta catalyst system, wherein the ratio of said organo-silane compound to said procatalyst ranges between 1:10 and 10:1 and the ratio of elemental silicon, present in said organo-silane compound to elemental titanium, present in said procatalyst, ranges between 1:10 and 10:1 and

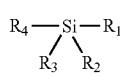

Formula I v. incorporating said heterogeneous Ziegler-Natta catalyst system in at least one monomer at a temperature ranging between 30° C. and 125° C., under ethylene pressure ranging between 2 bar and 10 bars, followed by agitation at a speed ranging between 300 and 700 revolutions per minute to obtain a polyolefin, wherein the ratio of said catalyst system and said monomer ranges between 1:20 and 1:220,
wherein $R_1$, $R_2$, $R_3$ and $R_4$ of said organo-silane compound is at least one selected from the group consisting of $C_1$-$C_{14}$ branched or straight chain alkyl, $C_1$-$C_{14}$ branched or straight chain alkyl oxy, substituted or unsubstituted aryl, substituted or unsubstituted aryl oxy, $C_4$-$C_{14}$ cyclic alkyl and $C_4$-$C_{14}$ cyclic alkyl oxy,
said polyolefin being characterized by molecular weight ranging between 3 and 17 million g/mole, bulk density ranging between 0.3 and 0.4 g/cc, intrinsic viscosity ranging between 20 and 65 dl/g, average particle size ranging between 155 and 165 microns and molecular weight distribution ranging between 10 and 14.

Typically, said magnesium compound is at least one selected from the group consisting of magnesium halide, magnesium oxide, magnesium hydroxylhalide and magnesium salt of inorganic oxygen containing acids.

Typically, said titanium halide is at least one selected from the group consisting of titanium chloride, titanium bromide, titanium iodide and titanium fluoride.

Typically, said organo-aluminum compound is at least one selected from the group consisting of triethyl aluminum, tridecyaluminum, tri-n-butyl aluminum, tri-isopropyl aluminum, tri-isoprenyl aluminum, tri-isobutyl aluminum hydride, ethyl aluminum sesquichloride, diethyl aluminum chloride, di-isobutyl aluminum chloride, triphenyl aluminum, tri-n-octyl aluminium and tri-n-decyl aluminum.

Typically, said hydrocarbon medium is at least one selected from the group consisting of pentane, hexane, cyclohexane, methyl cyclohexane, heptane, octane, nonane, decane, isopentane, varsol and isomers thereof.

Typically, said hydrocarbon medium of steps (iii) and (iv) are same or different.

Typically, said organo-silane compound is at least one selected from the group consisting of tetraethoxysilane, cyclohexylmethyldimethoxysilane, dicyclopentyldimethoxysilane, isobutylisopropyldimethoxysilane, n-propyltriethoxysilane, isobutyltriethoxysilane, phenyltriethoxysilane, diisopropyldimethoxysilane, diethyldimethoxysilane, diisobutyldimethoxysilane, aminopropyltriethoxysilane, diphenyldimethoxysilane and methyltrimethoxysilane.

Typically, said monomer is at least one selected from the group consisting of ethylene, propylene, butylene and alpha olefins.

Typically, said step of polymerization after incorporating said heterogeneous Ziegler-Natta catalyst system is carried out at a temperature ranging between 70° C.; and 80° C. The present disclosure still further provides a polyolefin prepared by the afore-stated process; said polyolefin being characterized in that the molecular weight ranges between 3 and 17 million g/mole, the bulk density ranges between 0.3 and 0.4 g/cc, intrinsic viscosity ranging between 20 and 65 dl/g, average particle size ranging between 155 and 165 microns and molecular weight distribution ranges between 10 and 14.

DETAILED DESCRIPTION

In accordance with one aspect of the present disclosure, there is provided a heterogeneous Ziegler-Natta catalyst system that comprises at least one procatalyst, at least one co-catalyst, at least one hydrocarbon medium and at least one external donor.

The procatalyst of the present disclosure comprises at least one titanium halide as a catalyst and at least one magnesium compound as a base (support). The catalyst of the present disclosure, i.e. the titanium halide includes but is not limited to titanium chloride, titanium bromide, titanium fluoride and titanium iodide. The magnesium compound or the base acts as a support for the catalyst and includes but is not limited to magnesium halide, magnesium oxide, magnesium hydroxyl halides and magnesium salts of inorganic oxygen containing acids. Typically, the ratio of the catalyst to the base ranges between 1.1:1.5 and 0.8:1.2. The elemental magnesium, the elemental titanium and the halide, together form the procatalyst and the ratio of elemental magnesium to elemental titanium to halide, in the procatalyst, is 1:1.3:3.7.

The co-catalyst of the present disclosure comprises at least one organo-aluminum compound that includes but is not limited to triethyl aluminum, tridecyaluminum, tri-n-butyl aluminum, tri-isopropyl aluminum, tri-isoprenyl aluminum, tri-isobutyl aluminum hydride, ethyl aluminumsesquichloride, diethyl aluminum chloride, di-isobutyl aluminum chloride, triphenyl aluminum, tri-n-octyl aluminium and tri-n-decyl aluminum. Typically, the ratio of the organo-aluminum compound to the procatalyst ranges between 9:15 and 1.2:0.8. Further, the ratio of elemental aluminum, present in the organo-aluminum compound to elemental titanium, present in the procatalyst, ranges between 6:1 and 12:1.

The hydrocarbon medium of the present disclosure includes but is not limited to pentane, hexane, cyclohexane, methyl cyclohexane, heptane, octane, nonane, decane; isopentane, varsol and their isomers thereof. Typically, varsol is a mixture of hydrocarbons, mostly linear alkanes, with boiling points ranging from 140° C. to 170° C. mostly to scavenge the impurities in the polymerization medium. It is present in an amount ranging between 0.4 and 0.6 l per 0.1 mmole of the catalyst.

The external donor of the present disclosure comprises at least one organo-silane compound represented by Formula I.

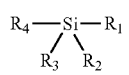

Formula I

Typically, the $R_1$, $R_2$, $R_3$ and $R_4$ of the organo-silane compound is at least one selected from the group consisting of $C_1$-$C_{14}$ branched or straight chain alkyl, $C_1$-$C_{14}$ branched or straight chain alkyl oxy, substituted or unsubstituted aryl, substituted or unsubstituted aryl oxy, $C_4$-$C_{14}$ cyclic alkyl and $C_4$-$C_{14}$ cyclic alkyl oxy. The ratio of the organo-silane compound to the procatalyst ranges between 1:10 and 10:1. Further, the ratio of elemental silicon, present in the organo-silane compound, to elemental titanium, present in the procatalyst, ranges between 1:10 and 10:1. Typically, the organo-silane compound includes but is not limited to tetraethoxysilane, cyclohexylmethyldimethoxysilane, dicyclopentyldimethoxysilane, isobutylisopropyldimethoxysilane, n-propyltriethoxysilane, isobutyltriethoxysilane, phenyltriethoxysilane, diisopropyldimethoxysilane, diethyldimethoxysilane, diisobutyldimethoxysilane, aminopropyltriethoxysilane, diphenyldimethoxysilane and methyltrimethoxysilane. The inclusion of the organo-silane donor results in an enhancement in the properties of the polymer that is prepared by using the donor-modified Ziegler Natta catalyst.

In accordance with another aspect of the present disclosure, there is provided a process for the preparation of the afore-stated heterogeneous Ziegler-Natta catalyst system. The first step of the process includes titanating at least one magnesium compound with at least one titanium halide, followed by allowing the titanium halide to bond with the magnesium compound, to obtain a mixture comprising at least one procatalyst. Typically, the ratio of the magnesium compound to the titanium halide ranges between 0.8:1.2 and 1.1:1.5. In the resultant mixture comprising the procatalyst, the ratio of elemental magnesium to elemental titanium to halide is 1:1.3:3.7. The magnesium compound of the present disclosure includes but is not limited to magnesium halide, magnesium oxide, magnesium hydroxylhalide and magnesium salt of inorganic oxygen containing acids. Further, the titanium halide includes but is not limited to titanium chloride, titanium bromide, titanium fluoride and titanium iodide.

The next step includes separating and washing the resultant mixture comprising the procatalyst to obtain a procatalyst.

The procatalyst is then admixed with at least one organo-aluminum compound as a co-catalyst, to obtain an activated catalyst. The organo-aluminum compound includes but is not limited to triethyl aluminum, tridecyl aluminum, tri-n-butyl aluminum, tri-isopropyl aluminum, tri-isoprenyl aluminum, tri-isobutyl aluminum hydride, ethyl aluminum sesquichloride, diethyl aluminum chloride, di-isobutyl aluminum chloride, triphenyl aluminum, tri-n-octyl aluminium and tri-n-decyl aluminum. The step of admixing is carried out in the presence of at least one hydrocarbon medium that includes but is not limited to pentane, hexane, cyclohexane, methyl cyclohexane, heptane, octane, nonane, decane, isopentane, varsol and isomers thereof. Typically, the ratio of the organo-aluminum compound to the procatalyst ranges between 9:15 and 1.2:0.8. Also, the ratio of elemental aluminum, present in the organo-aluminum compound to elemental titanium, present in the procatalyst, ranges between 6:1 and 12:1.

Subsequently, at least one organo-silane compound is added to the activated catalyst, in a controlled manner to provide a heterogeneous Ziegler-Natta catalyst system. The organo-silane compound is represented by Formula 1 and acts as an external donor.

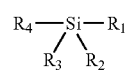

Formula I

Typically, the $R_1$, $R_2$, $R_3$ and $R_4$ of the organo-silane compound is at least one selected from the group consisting of $C_1$-$C_{14}$ branched or straight chain alkyl, $C_1$-$C_{14}$ branched or straight chain alkyl oxy, substituted or unsubstituted aryl, substituted or unsubstituted aryl oxy, $C_4$-$C_{14}$ cyclic alkyl and $C_4$-$C_{14}$ cyclic alkyl oxy. The organo-silane compound includes but is not limited to tetraethoxysilane, cyclohexylmethyldimethoxysilane, dicyclopentyldimethoxysilane, isobutylisopropyldimethoxysilane, n-propyltriethoxysilane, isobutyltriethoxysilane, phenyltriethoxysilane, diisopropyldimethoxysilane, diethyldimethoxysilane, diisobutyldimethoxysilane, aminopropyltriethoxysilane, diphenyldimethoxysilane and methyltrimethoxysilane. The organo-silane is added in a controlled manner to a stirred solution of the activated catalyst to achieve uniform modification of the catalyst sites. The addition is carried out in the presence of at least one hydrocarbon medium, under inert conditions, at a temperature ranging between 25° C. and 30° C. The time period of addition ranges between 2 and 10 minutes in laboratory and pilot scales, which can be proportionally increased when working in plant scale. The time may vary within the afore-stated range as the donor addition under gentle agitation of the activated catalyst solution ensures homogeneous and uniform catalyst modification. Typically, the ratio of the organo-silane compound to the procatalyst ranges between 1:10 and 10:1 and the ratio of elemental silicon, present in the organo-silane compound to elemental titanium, present in the procatalyst, ranges between 1:10 and 10:1. Typically, the hydrocarbon medium used in the process of the present disclosure is same or different.

In accordance with yet another aspect of the present disclosure, there is provided a process for the preparation of an UHMW polyolefin. The first step of the process includes titanating at least one magnesium compound with at least one titanium halide, followed by allowing said titanium halide to bond with said magnesium compound, to obtain a mixture comprising at least one procatalyst. Typically, the ratio of the magnesium compound to the titanium halide ranges between 0.8:1.2 and 1.1:1.5. In the resultant mixture comprising the procatalyst, the ratio of elemental magnesium to elemental titanium to halide is 1:1.3:3.7. The magnesium compound of the present disclosure includes but is not limited to magnesium halide, magnesium oxide, magnesium hydroxylhalide and magnesium salt of inorganic oxygen containing acids. Further, the titanium halide includes but is not limited to titanium chloride, titanium bromide, titanium fluoride and titanium iodide.

The next step includes separating and washing the resultant mixture comprising the procatalyst to obtain a procatalyst.

The procatalyst is then admixed with at least one organo-aluminum compound as a co-catalyst, to obtain an activated catalyst. The organo-aluminum compound includes but is not limited to triethyl aluminum, tridecyl aluminum, tri-n-butyl aluminum, tri-isopropyl aluminum, tri-isoprenyl aluminum, tri-isobutyl aluminum hydride, ethyl aluminum sesquichloride, diethyl aluminum chloride, di-isobutyl aluminum chloride, triphenyl aluminum, tri-n-octyl aluminium and tri-n-decyl aluminum. The step of admixing is carried out in the presence of at least one hydrocarbon medium that includes but is not limited to pentane, hexane, cyclohexane, methyl cyclohexane, heptane, octane, nonane, decane, isopentane, varsol and isomers thereof. Typically, the ratio of the organo-aluminum compound to the procatalyst ranges between 9:15 and 1.2:0.8. Also, the ratio of elemental aluminum, present in the organo-aluminum compound to elemental titanium, present in the procatalyst, ranges between 6:1 and 12:1.

Subsequently, at least one organo-silane compound is added to the activated catalyst, in a controlled manner to provide a heterogeneous Ziegler-Natta catalyst system. The organo-silane compound is represented by Formula 1 and acts as an external donor.

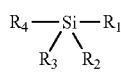

Formula I

Typically, $R_1$, $R_2$, $R_3$ and $R_4$ of the organo-silane compound is at least one selected from the group consisting of $C_1$-$C_{14}$ branched or straight chain alkyl, $C_1$-$C_{14}$ branched or straight chain alkyl oxy, substituted or unsubstituted aryl, substituted or unsubstituted aryl oxy, $C_4$-$C_{14}$ cyclic alkyl and $C_4$-$C_{14}$ cyclic alkyl oxy. The organo-silane compound includes but is not limited to tetraethoxysilane, cyclohexylmethyldimethoxysilane, dicyclopentyldimethoxysilane, isobutylisopropyldimethoxysilane, n-propyltriethoxysilane, isobutyltriethoxysilane, phenyltriethoxysilane, diisopropyldimethoxysilane, diethyldimethoxysilane, diisobutyldimethoxysilane, aminopropyltriethoxysilane, diphenyldimethoxysilane and methyltrimethoxysilane. The organo-silane is added in a controlled manner to a stirred solution of the activated catalyst to achieve uniform modification of the catalyst sites. The addition is carried out in the presence of at least one hydrocarbon medium, under inert conditions, at a temperature ranging between 25° C. and 30° C. The time period of addition ranges between 2 and 10 minutes in laboratory and pilot scales, which can be proportionally increased when working in plant scale. The time may vary within the afore-stated range as the donor addition under gentle agitation of the activated catalyst solution ensures homogeneous and uniform catalyst modification. Typically, the ratio of the organo-silane compound to the procatalyst ranges between 1:10 and 10:1 and the ratio of elemental silicon, present in the organo-silane compound to elemental titanium, present in the procatalyst, ranges between 1:10 and 10:1.

Typically, the hydrocarbon medium used in the process of the present disclosure is same or different.

The next step is the polymerization reaction which includes incorporating the aforementioned heterogeneous Ziegler-Natta catalyst system in at least one monomer to obtain an UHMW polyolefin. The polymerization is carried out at a temperature ranging between 30° C. and 125° C., under ethylene pressure (pressure of ethylene monomer used during polymerization) ranging between 2 bar and 10 bars, followed by agitation at a speed ranging between 300 and 700 revolutions per minute. Typically, the ratio of the catalyst system and the monomer ranges between 1:20 and 1:220. Further, the monomer includes but is not limited to ethylene, propylene, butylene and other α-olefins. Even further, the step of polymerization after incorporating the catalyst system is carried out at a temperature ranging between 70° C. and 80° C.

The polyolefin prepared by the process of the present disclosure is characterized in that the molecular weight ranges between 3 and 17 million g/mole, the bulk density ranges between 0.3 and 0.4 g/cc, intrinsic viscosity ranging between 20 and 65 dl/g, average particle size ranging between 155 and 165 microns and molecular weight distribution ranges between 10 and 14.

The addition of the organo-silane donor in the afore-stated quantities modifies the active sites in the catalyst (titanium) as well as the support (magnesium compound), enabling the polymerization to follow a modified kinetic profile, thereby resulting in the production of UHMWPE with increased bulk density and intrinsic viscosity. Along with the increase in the bulk density, a controlled and uniform particle size distribution with the desired average particle size and narrow molecular weight distribution is observed. The enhancement of the polymer characteristics depends on the type of silane donor used which influences the complexation ability with the catalyst. The donor of the present disclosure stabilizes the oxidation state of the metal in the catalyst through chelation with the Lewis acids such as Ti species in different oxidation states and aluminum alkyl. Other than the type of the donor, the donor to elemental titanium ratio and also the operating pressure are also crucial for achieving the property enhancement. Typically, higher pressures of ethylene ranging from 5 to 7.5 bars improve the productivity and also further increase the molecular weight of the polymer. The donor modified catalyst system electronically as well as geometrically (stereospecifically) influences the UHMWPE properties such as intrinsic viscosity and molecular weight distribution as determined from RDA (Rheometric Dynamic Analyzer).

The present disclosure will now be discussed in the light of the following non-limiting embodiments:

Example 1: Preparation of UHMW Polyolefins Without the Addition of an External Donor to the Catalyst System A procatalyst of composition Mg:Ti:Cl::1:1.3:3.7 was taken, where the Ti was 100% tetravalent and had an average particle size of 6 to 7 microns diameter. Simultaneously, an admixture was formed by mixing 0.206 g of TEAL (co-catalyst) in 500 ml of varsol (polymerization medium). TEAL was added to scavenge the impurities in the medium, besides providing the Al/Ti molar ratio of 11±2, required during polymerization. 0.028 g (1.4 ml of the catalyst slurry equivalent to 0.028 g of catalyst which is further equivalent to 0.164 mmole of Ti) of the afore-stated procatalyst was added to the admixture to lead to in-situ reduction of the tetravalent Ti to trivalent Ti, within a time period of 4±2 minutes, at 25-30° C. temperature, under nitrogen pressure.

The process of polymerization was started using ethylene as a monomer. The pressure (ethylene) was made to range between 2 and 7.5 bars, with 75±1° C. as the polymerization temperature. A suitable kinetic profile resulting in an exotherm ranging between 9 and 30° C. was derived and maintained by adjusting the input and output temperatures of the heating source and the reactor. The agitation was maintained at 500±50 rpm for 2.25±0.25 hours. The resultant UHMW polyolefins had intrinsic viscosity of about 24.1-25.3 dl/g corresponding to an ASTM molecular weight of about 3.5-4.5 million g/mole.

Example 2: Preparation of UHMW Polyolefins with the Addition of an External Donor to the Catalyst System A procatalyst of composition Mg:Ti:Cl::1:1.3:3.7 was taken, where the Ti was 100% tetravalent and had an average particle size of 6 to 7 microns diameter. Simultaneously, an admixture was formed by mixing 0.206 g of TEAL (co-catalyst) in 500 ml of varsol (polymerization medium). TEAL was added to scavenge the impurities in the medium, besides providing the Al/Ti molar ratio of 11±2, required during polymerization. 0.028 g (1.4 ml of the catalyst slurry equivalent to 0.028 g of catalyst which is further equivalent to 0.164 mmole of Ti) of the afore-stated procatalyst was added to the admixture to lead to in-situ reduction of the tetravalent Ti to trivalent Ti, immediately followed by addition of tetraethoxy silane (TEOS) as an organo-silane donor such that the molar ratio of the donor to the procatalyst ranged from 0.5 to 9. The addition was carried out at 25-30° C. temperature, under nitrogen atmosphere for a time period ranging between 4±2 minutes, resulting in in-situ chelation between the Titanium, Lewis acid and Lewis base species; thereby generating the heterogeneous Ziegler-Natta catalyst system of the present disclosure.

The process of polymerization was started using ethylene as a monomer. The pressure (ethylene) was made to range between 2 and 7.5 bars, with 75±1° C. as the polymerization temperature. A suitable kinetic profile resulting in an exotherm ranging between 5 and 20° C. (significantly lower than in Example 1) was derived and maintained by adjusting the input and output temperatures of the heating source and the reactor. The agitation was maintained at 500±50 rpm for 2.25±0.25 hours. The resultant UHMW polyolefins had intrinsic viscosity from 27 to 52 dl/g corresponding to an ASTM molecular weight of about 5 to 12 million g/mole.

Example 3: Effect of Different Organo-Silane Donors in Modifying the Catalyst and Impacting the Polymer Properties The effect of different organo-silane donors in modifying the catalyst and resulting in different polymer characteristics is depicted below (Table 1). The donors evaluated were (TEOS) tetraethoxysilane, (C-donor) cyclohexylmethyldimethoxysilane, (D-donor) dicyclopentyldimethoxysilane, (IBIPDMS) isobutylisopropyldimethoxysilane, (NPTES) n-propyltriethoxysilane, (IBTES) isobutyltriethoxysilane, (PTES) phenyltriethoxysilane, (DIPDMS) diisopropyldimethoxysilane, (DEDMS) diethyldimethoxysilane, (DIBDMS) diisobutyldimethoxysilane, (APTES) aminopropyltriethoxysilane, (DPDMS) diphenyldimethoxysilane and (MTMS) methyltrimethoxysilane

TABLE 1

Effect of different organo-silane donors in modifying the catalyst and impacting the polymer properties

| Silane Donor | Donor/Ti molar ratio | IV (dl/g) of UHMWPE obtained | Molecular weight (ASTM) of UHMWPE obtained (million g/mole) |
|---|---|---|---|
| TEOS | 4 | 31 | 5.9 |
| DPDMS | 5.0 | 26.9 | 4.9 |
| D-donor | 4.0 | 33.1 | 6.5 |
| C-donor | 1.0 | 23.2 | 4.0 |
| MTMS | 2.0 | 23.2 | 4.0 |
| IBIPDMS | 4.0 | 28.9 | 5.4 |
| NPTES | 4.0 | 29.8 | 5.6 |
| IBTES | 4.0 | 37.3 | 7.6 |
| PTES | 4.0 | 45.1 | 9.9 |
| DIPDMS | 4.0 | 42.3 | 9.1 |
| DEDMS | 4.0 | 50.0 | 11.4 |
| DIBDMS | 4.0 | 51.2 | 11.8 |
| APTES | 4.0 | 52.2 | 12.1 |

The polymerization conditions maintained were as follows: 0.5 l varsol; about 9% TEAL solution in hexane as a co-catalyst; Ti from catalyst=0.164 mmole; Al/Ti about 9-12; D=Organo silane donors (10% solution in Hexane); 75° C.; 2 hr; 500 rpm; Ethylene pressure=2.5 bars; 1 l Buchi-glasuster polylcave glass reactor.

Mode of addition: Varsol (polymerization medium)+TEAL (co-catalyst)+procatalyst+D (donor); Equilibration time≤5 min.

Example 4: Effect of Donor/Ti Ratio in Modifying the Catalyst and Impacting the Polymer Properties The effect of Donor/Ti ratio in impacting the IV and molecular weight is given in Table 2 for the donor TEOS. It was observed that as the Donor/Ti ratio increased the molecular weight and IV also increased. This observation provided a very good handle to control and achieve the desired IV and molecular weight of the UHMWPE produced.

TABLE 2

Effect of Donor/Ti ratio in modifying the catalyst and impacting the polymer properties

| Donor/Ti | IV (dl/g) | Molecular weight (M) (ASTM) | Bulk density (g/cc) | Average particle size (μ) | UHMWPE g/g of catalyst |
|---|---|---|---|---|---|
| 0 - control | 17.6 | 2.7 | 0.3402 | 169 | 7027 |
| 0.5 | 18.3 | 2.9 | 0.3658 | 166 | 6795 |
| 1.0 | 20.6 | 3.4 | 0.3625 | 159 | 5405 |
| 2.0 | 25.3 | 4.5 | 0.3602 | 161 | 5212 |
| 4.0 | 31 | 5.9 | 0.3638 | 156 | 3900 |

The polymerization conditions maintained were as follows: 0.5 l varsol; about 9% TEAL solution in hexane as co-catalyst; Ti from catalyst=0.164 mmole; Al/Ti about 9-12; D=TEOS donor (10% solution in Hexane); 75° C.; 2 hours; 500 rpm; Ethylene pressure=2.5 bars; 1 l Buchi-glasuster polylcave glass reactor.

Mode of addition: Varsol (polymerization medium)+TEAL (co-catalyst)+Catalyst+D (donor); Equilibration time≤5 min.

Example 5: Effect of Ethylene Pressure in Modifying the Catalyst and Impacting the Polymer Properties The effect of ethylene pressure in impacting the IV and molecular weight is given below for the donor TEOS (tetraethoxy silane) at a specific Donor/Ti ratio—4.0 (Table 3). It can be seen that as the ethylene pressure increased the molecular weight and IV also increased. This also provides a very good handle to control and achieve the desired IV and molecular weight of the UHMWPE produced.

TABLE 3

Effect of ethylene pressure in modifying the catalyst and impacting the polymer properties

| D/Ti; donor | IV (dl/g) | MW (M) (ASTM) | Medium & ethylene pressure |
|---|---|---|---|
| 4.0; TEOS | 31.7 | 6.1 | Varsol; 2.5 bars |
| 4.0; TEOS | 34.7 | 6.9 | Varsol; 5.0 bars |
| 4.0; TEOS | 43.1 | 9.3 | Varsol; 7.5 bars |

TABLE 3-continued

Effect of ethylene pressure in modifying the
catalyst and impacting the polymer properties

| D/Ti; donor | IV (dl/g) | MW (M) (ASTM) | Medium & ethylene pressure |
|---|---|---|---|
| 4.0; TEOS | 26.6 | 4.8 | Hexane; 4.0 bars |
| 4.0; TEOS | 40.3 | 8.5 | Hexane; 7.5 bars |

The polymerization conditions maintained were as follows: 0.5 l varsol or hexane; about 9% TEAL solution in hexane as a co-catalyst; Ti from catalyst=0.164 mmole; Al/Ti about 9-12; D=TEOS donor (10% solution in Hexane); 75° C.; 2 hours; 500 rpm; Ethylene pressure varied from 2.5 to 7.5 bars; 1 l Buchi-glasuster polylcave glass reactor.

Mode of addition: Varsol or hexane as the polymerization medium+TEAL (co-catalyst)+Catalyst+D (donor); Equilibration time≤5 min.

Example 6: Effect of Donor in Narrowing Down MWD as Observed from Rheometry

The molecular weight and molecular weight distribution of the UHMWPE samples were studied by rheometry and the results are tabulated in Table 4.

Dynamic rheometry of the UHMW polyethylene samples was carried out at 190° C. keeping the strain at 2% and the measurements were made in the frequency range of 0.01-100 rad/s. 25 mm parallel plate assembly was employed for the analysis. The melt rheological data were used to obtain molecular weight and molecular weight distribution data using the Orchestrator software. It was found that the donor modified catalyst is able to narrow down the molecular weight distribution by ≥40%.

TABLE 4

Effect of donor in narrowing down MWD

| UHMWPE sample | TEOS donor (D) | Mw | MWD |
|---|---|---|---|
| From control expt. using non modified catalyst | None | 6.67M | 19.77 |
| From control expt. using non modified catalyst | None | 5.81M | 21.77 |
| From control expt. using non modified catalyst | None | 3.40M | 11.26 |
| From experiment using TEOS donor modified catalyst | Donor/Ti = 0.5 | 3.2M | 10.90 |
| From experiment using TEOS donor modified catalyst | Donor/Ti = 2.0 | 5.5M | 13.40 |
| From experiment using TEOS donor modified catalyst | Donor/Ti = 4.0 | 6.82M | 13.91 |

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

TECHNICAL ADVANTAGES AND ECONOMIC SIGNIFICANCE

The polyolefins prepared in accordance with the present disclosure have very high molecular weight and intrinsic viscosity, better bulk density and uniform particle size distribution.

Further, the polyolefins prepared in accordance with the present disclosure have lower average particle size as derived from the uniform particle size distribution and lower molecular weight distribution (lowering by greater than 40%).

Further, the catalyst used for making UHMWPE with molecular weight in the range of 3.5 to 4.5 million g/mole, can be easily modified just by the addition of the requisite quantity of the silane donor such as TEOS, to produce UHMWPE with molecular weight as high as 16 million g/mole.

Even further, the process of the present disclosure obviates the use of costly single site/metallocene catalyst systems and methylalumoxane as an activator for achieving such high molecular weights, thereby making the process economical and environment friendly.

Still further, the use of the Ziegler-Natta catalyst of the present disclosure prevents fouling of the reactor as in case of conventional processes.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

The numerical values given for various physical parameters, dimensions and quantities are only approximate values and it is envisaged that the values higher than the numerical value assigned to the physical parameters, dimensions and quantities fall within the scope of the invention and the claims unless there is a statement in the specification to the contrary.

While certain embodiments of the inventions have been described, these embodiments have been presented by way of example only, and are not intended to limit the scope of the inventions. Variations or modifications in the process or compound or formulation or combination of this invention, within the scope of the invention, may occur to those skilled in the art upon reviewing the disclosure herein. Such variations or modifications are well within the spirit of this invention. The accompanying claims and their equivalents are intended to cover such forms or modifications as would fall within the scope and spirit of the invention.

The invention claimed is:

1. A heterogeneous Ziegler-Natta catalyst system for preparation of UHMWPE comprising:
    at least one procatalyst prepared from:
        at least one titanium halide; and
        at least one magnesium compound, wherein, the molar ratio of elemental magnesium to elemental titanium to halide in said procatalyst is 1:1.3:3.7;
    at least one co-catalyst comprising at least one organo-aluminum compound, wherein the molar ratio of elemental aluminum of said organo-aluminum compound to elemental titanium of said procatalyst ranges between 6:1 and 12:1;
    at least one hydrocarbon medium in an amount ranging between 0.4 and 0.6l per 0.1 mmole of the catalyst system; and
    at least one external donor comprising at least one organo-silane compound of Formula I, wherein the molar ratio of elemental silicon of said organo-silane compound to elemental titanium of said pro-catalyst is 4:1,

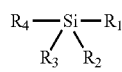
Formula I wherein $R_1$, $R_2$, $R_3$ and $R_4$ of said organo-silane compound is at least one selected from the group consisting of $C_1$-$C_{14}$ branched or straight chain alkyl, $C_1$-$C_{14}$ branched or straight chain alkyl oxy, substituted or unsubstituted aryl, substituted or unsubstituted aryl oxy, $C_4$-$C_{14}$ cyclic alkyl and $C_4$-$C_{14}$ cyclic alkyl oxy.

2. The catalyst system as claimed in claim 1, wherein said titanium halide is at least one selected from the group consisting of titanium chloride, titanium bromide, titanium iodide and titanium fluoride.

3. The catalyst system as claimed in claim 1, wherein said magnesium compound is at least one selected from the group consisting of magnesium halide, magnesium oxide, magnesium hydroxyl halides and magnesium salts of inorganic oxygen containing acids.

4. The catalyst system as claimed in claim 1, wherein said organo-aluminum compound is at least one selected from the group consisting of triethyl aluminum, tridecyaluminum, tri-n-butyl aluminum, tri-isopropyl aluminum, tri-isoprenyl aluminum, tri-isobutyl aluminum hydride, ethyl aluminum-sesquichloride, diethyl aluminum chloride, di-isobutyl aluminum chloride, triphenyl aluminum, tri-n-octyl aluminium and tri-n-decyl aluminum.

5. The catalyst system as claimed in claim 1, wherein said hydrocarbon medium is at least one selected from the group consisting of pentane, hexane, cyclohexane, methyl cyclohexane, heptane, octane, nonane, decane, isopentane, varsol and isomers thereof.

6. The catalyst system as claimed in claim 1, wherein said organo-silane compound is at least one selected from the group consisting of tetraethoxysilane, cyclohexylmethyldimethoxysilane, dicyclopentyldimethoxysilane, isobutylisopropyldimethoxysilane, n-propyltriethoxysilane, isobutyltriethoxysilane, phenyltriethoxysilane, diisopropyldimethoxysilane, diethyldimethoxysilane, diisobutyldimethoxysilane, aminopropyltriethoxysilane, diphenyldimethoxysilane and methyltrimethoxysilane.

7. A process for the preparation of a heterogeneous Ziegler-Natta catalyst system for preparation of UHMWPE; said process comprising the following steps:
    titanating at least one magnesium compound with at least one titanium halide, followed by allowing said titanium halide to bond with said magnesium compound, to obtain a mixture comprising at least one procatalyst; wherein the molar ratio of elemental magnesium to elemental titanium to halide is 1:1.3:3.7;
    separating and washing said mixture comprising the procatalyst to obtain a procatalyst;
    admixing said procatalyst and at least one organo-aluminum compound as a co-catalyst, in the presence of at least one hydrocarbon medium, to obtain an activated catalyst, wherein the molar ratio of elemental aluminum, present in said organo-aluminum compound to elemental titanium, present in said procatalyst, ranges between 6:1 and 12:1; and
    adding, in a controlled manner, at least one organo-silane compound of Formula 1 as an external donor to said activated catalyst, in the presence of at least one hydrocarbon medium, under inert conditions, at a temperature ranging between 25° C. and 30° C. and over a time period ranging between 2 and 10 minutes, to obtain a heterogeneous Ziegler-Natta catalyst system, wherein the molar ratio of elemental silicon, present in said organo-silane compound to elemental titanium, present in said procatalyst is 4:1,

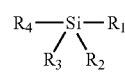
Formula I wherein $R_1$, $R_2$, $R_3$ and $R_4$ of said organo-silane compound is at least one selected from the group consisting of $C_1$-$C_{14}$ branched or straight chain alkyl, $C_1$-$C_{14}$ branched or straight chain alkyl oxy, substituted or unsubstituted aryl, substituted or unsubstituted aryl oxy, $C_4$-$C_{14}$ cyclic alkyl and $C_4$-$C_{14}$ cyclic alkyl oxy.

8. The process as claimed in claim 7, wherein the hydrocarbon medium of steps (iii) and (iv) are same or different.

9. A process for the preparation of UHMWPE; said process comprising the following steps:
    titanating at least one magnesium compound with at least one titanium halide, followed by allowing said titanium halide to bond with said magnesium compound, to obtain a mixture comprising at least one procatalyst; wherein the molar ratio of elemental magnesium to elemental titanium to halide is 1:1.3:3.7;
    separating and washing said mixture comprising the procatalyst to obtain a procatalyst;
    admixing said procatalyst and at least one organo-aluminum compound as a co-catalyst, in the presence of at least one hydrocarbon medium, to obtain an activated catalyst, wherein the molar ratio of elemental aluminum, present in said organo-aluminum compound to elemental titanium, present in said procatalyst, ranges between 6:1 and 12:1; and
    adding, in a controlled manner, at least one organo-silane compound of Formula 1 as an external donor to said activated catalyst, in the presence of at least one hydrocarbon medium, under inert conditions, at a temperature ranging between 25° C. and 30° C. and over a time period ranging between 2 and 10 minutes, to obtain a heterogeneous Ziegler-Natta catalyst system, wherein the molar ratio of elemental silicon, present in said organo-silane compound to elemental titanium, present in said procatalyst is 4:1, and

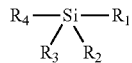 Formula I incorporating said heterogeneous Ziegler-Natta catalyst system in ethylene monomer at a temperature ranging between 30° C. and 125° C., under ethylene pressure ranging between 2 bar and 10 bars, followed by agitation at a speed ranging between 300 and 700 revolutions per minute to obtain a polyolefin, wherein the ratio of said catalyst system and said monomer ranges between 1:20 and 1:220,
wherein $R_1$, $R_2$, $R_3$ and $R_4$ of said organo-silane compound is at least one selected from the group consisting of $C_1$-$C_{14}$ branched or straight chain alkyl, $C_1$-$C_{14}$ branched or straight chain alkyl oxy, substituted or unsubstituted aryl, substituted or unsubstituted aryl oxy, $C_4$-$C_{14}$ cyclic alkyl and $C_4$-$C_{14}$ cyclic alkyl oxy,
said UHMWPE being characterized by molecular weight ranging between 3 and 17 million g/mole, bulk density ranging between 0.3 and 0.4 g/cc, intrinsic viscosity ranging between 20 and 65 dl/g, average particle size ranging between 155 and 165 microns and molecular weight distribution ranging between 10 and 14.

10. The process as claimed in claim 9, wherein said hydrocarbon medium of steps (iii) and (iv) are same or different.

11. The process as claimed in claim 9, wherein said step of polymerization after incorporating said heterogeneous Ziegler-Natta catalyst system is carried out at a temperature ranging between 70° C. and 80° C.

12. The process as claimed in claim 7, wherein said titanium halide is at least one selected from the group consisting of titanium chloride, titanium bromide, titanium iodide and titanium fluoride.

13. The process as claimed in claim 7, wherein said magnesium compound is at least one selected from the group consisting of magnesium halide, magnesium oxide, magnesium hydroxyl halides and magnesium salts of inorganic oxygen containing acids.

14. The process as claimed in claim 7, wherein said organo-aluminum compound is at least one selected from the group consisting of triethyl aluminum, tridecyaluminum, tri-n-butyl aluminum, tri-isopropyl aluminum, tri-isoprenyl aluminum, tri-isobutyl aluminum hydride, ethyl aluminum-sesquichloride, diethyl aluminum chloride, di-isobutyl aluminum chloride, triphenyl aluminum, tri-n-octyl aluminium and tri-n-decyl aluminum.

* * * * *